(12) United States Patent
Tanghetti

(10) Patent No.: US 11,138,908 B2
(45) Date of Patent: Oct. 5, 2021

(54) COMPONENT FOR A FLUIDIC CIRCUIT AND VALVE COMPRISING SAID COMPONENT

(71) Applicant: EFFEBI S.P.A., Bovezzo (IT)

(72) Inventor: Ermanno Tanghetti, Concesio (IT)

(73) Assignee: EFFEBI S.P.A., Bovezzo (IT)

( * ) Notice: Subject to any disclaimer, the term of this patent is extended or adjusted under 35 U.S.C. 154(b) by 0 days.

(21) Appl. No.: 16/651,299

(22) PCT Filed: Sep. 28, 2018

(86) PCT No.: PCT/IB2018/057564
§ 371 (c)(1),
(2) Date: Mar. 26, 2020

(87) PCT Pub. No.: WO2019/064262
PCT Pub. Date: Apr. 4, 2019

(65) Prior Publication Data
US 2020/0273377 A1   Aug. 27, 2020

(30) Foreign Application Priority Data

Sep. 28, 2017   (IT) .................. 202017000108877

(51) Int. Cl.
| G09F 3/02 | (2006.01) |
| G09F 3/00 | (2006.01) |
| F16L 29/00 | (2006.01) |
| G01N 21/78 | (2006.01) |
| G09F 3/20 | (2006.01) |

(52) U.S. Cl.
CPC .......... *G09F 3/0295* (2013.01); *F16L 29/002* (2013.01); *G01N 21/78* (2013.01); *G09F 3/205* (2013.01); *F16L 2201/60* (2013.01); *G09F 2003/0251* (2013.01)

(58) Field of Classification Search
CPC ................... G09F 3/0295; G09F 3/205; G09F 2003/0251; F16L 2201/60
See application file for complete search history.

(56) References Cited

U.S. PATENT DOCUMENTS

| 3,468,046 A * | 9/1969 | Makishima ........... B42D 25/351 283/89 |
| 3,787,993 A * | 1/1974 | Lyon ......................... G09F 3/00 40/306 |
| 4,268,986 A * | 5/1981 | Piana ...................... G09F 3/205 40/316 |
| 5,343,608 A * | 9/1994 | MacDonald ............ G09F 3/005 283/75 |

(Continued)

FOREIGN PATENT DOCUMENTS

WO   2009137756 A1   11/2009

OTHER PUBLICATIONS

International Search Report and Written Opinion for Application No. PCT/IB2018/057564 dated Jan. 24, 2019.

(Continued)

*Primary Examiner* — Gary C Hoge
(74) *Attorney, Agent, or Firm* — Workman Nydegger

(57) ABSTRACT

A component for a fluidic circuit is provided with at least one tubular portion extending around an axis and with at least one annular identifying band, which is coupled to the tubular portion.

21 Claims, 3 Drawing Sheets

(56) References Cited

U.S. PATENT DOCUMENTS

| | | | | | |
|---|---|---|---|---|---|
| 5,390,964 | A | * | 2/1995 | Gray, Jr. | B29C 61/0608 138/104 |
| 5,782,581 | A | * | 7/1998 | DeCanio | G09F 3/04 40/666 |
| 2001/0040374 | A1 | * | 11/2001 | Breihan | E21B 17/00 285/93 |
| 2003/0173534 | A1 | * | 9/2003 | Giacomin | F16K 5/0647 251/315.01 |
| 2005/0267404 | A1 | * | 12/2005 | Kraushaar | A61M 5/14 604/80 |
| 2009/0120350 | A1 | * | 5/2009 | Tamez, Jr. | A62B 3/00 116/205 |
| 2009/0277570 | A1 | * | 11/2009 | Caveney | G09F 3/02 156/184 |
| 2012/0211974 | A1 | * | 8/2012 | Richardson | A62C 33/00 285/93 |
| 2014/0028017 | A1 | * | 1/2014 | Stiatti | F16L 15/08 285/119 |
| 2015/0213736 | A1 | * | 7/2015 | Larsen | G09F 3/06 29/453 |
| 2016/0245443 | A1 | * | 8/2016 | Zonneveld | F16L 37/18 |
| 2016/0358517 | A1 | * | 12/2016 | Pate | G09F 3/0295 |
| 2018/0327155 | A1 | * | 11/2018 | Groll | B65D 63/14 |
| 2019/0279537 | A1 | * | 9/2019 | Heinzlmeir | G09F 3/02 |
| 2019/0298616 | A1 | * | 10/2019 | Quintero | A61J 9/0623 |

OTHER PUBLICATIONS

International Preliminary Report on Patentability and Written Opinion for Application No. PCT/1132018/057564, dated Feb. 12, 2020.

\* cited by examiner

COMPONENT FOR A FLUIDIC CIRCUIT AND VALVE COMPRISING SAID COMPONENT

CROSS-REFERENCE TO RELATED APPLICATIONS

The present application is a 35 U.S.C. § 371 US National Stage Application corresponding to PCT/IB2018/057564, filed Sep. 28, 2018, which claims the benefit of priority to Italian Utility Model Patent Application No. 202017000108877, filed on Sep. 28, 2017. The entire content of each of the aforementioned applications is incorporated herein by reference.

TECHNICAL FIELD

The invention relates to a component for a fluidic circuit.

BACKGROUND ART

Fluidic components are usually used to create more or less complex circuits.

The term fluidic components identifies, for example, parts of valves of any type, parts of filters or joints, etc.

Technical information reported on these components are often necessary for installers or, if necessary, for maintenance operators working on the circuit after it has been installed.

However, these information are directly printed on the component and cannot easily be read once the component is installed in the circuit.

As a matter of fact, the components are often placed in positions in which the technical information is hidden or in positions with a scarce visibility.

DISCLOSURE OF INVENTION

Therefore, the object of the invention is to improve the access to the information printed on the component in an easy and economic fashion, both from the functional point of view and from the constructive point of view.

According to these objects, the invention relates to a component for a fluidic circuit provided with at least one tubular portion extending around an axis and with an annular identifying band, which is coupled to the tubular portion.

Thanks to this invention, all the items of information can be printed on the identifying band and be easily read.

BRIEF DESCRIPTION OF THE DRAWINGS

Further features and advantages of the invention will be best understood upon perusal of the following description of a non-limiting embodiment thereof, with reference to the accompanying drawing, wherein.

BEST MODE FOR CARRYING OUT THE INVENTION

Figure 1:
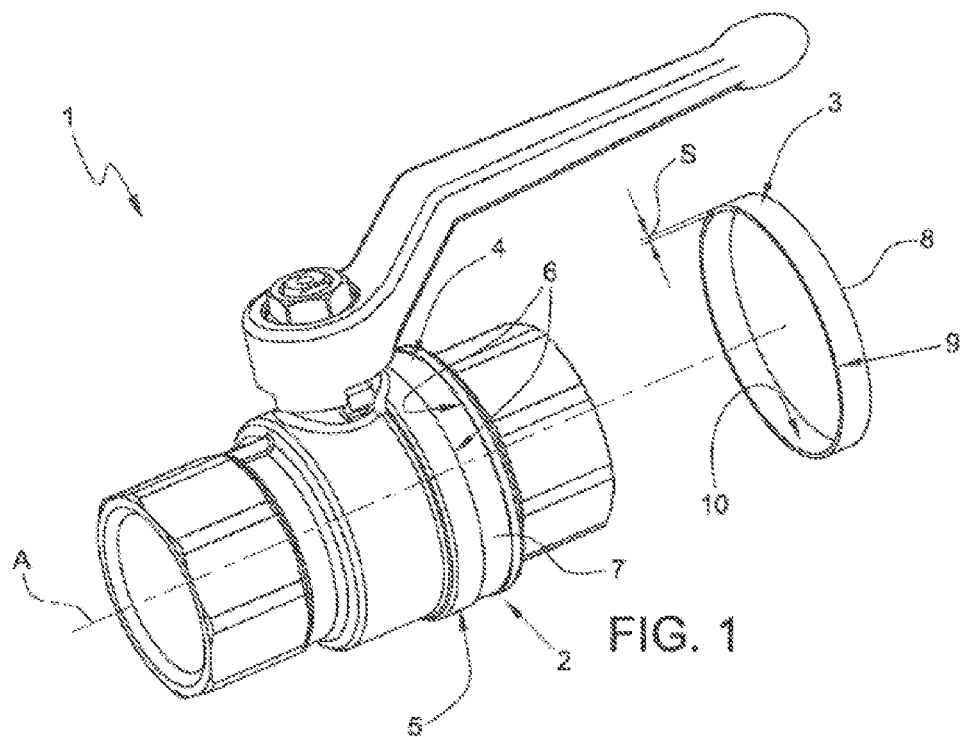
FIG. 1 is a schematic, partially exploded, perspective view, with parts removed for greater clarity, of a component according to the invention.

In FIG. 1, number 1 indicates a component for a fluidic circuit according to the invention.

In the non-limiting example described and shown herein, the component 1 is a part of a valve specifically designed for hydraulic use.

The invention can obviously be applied to any other component to be installed in hydraulic circuits and/or in gas circuits and/or in circuits for carrying any other type of fluid in liquid or gaseous form.

Figure 2:
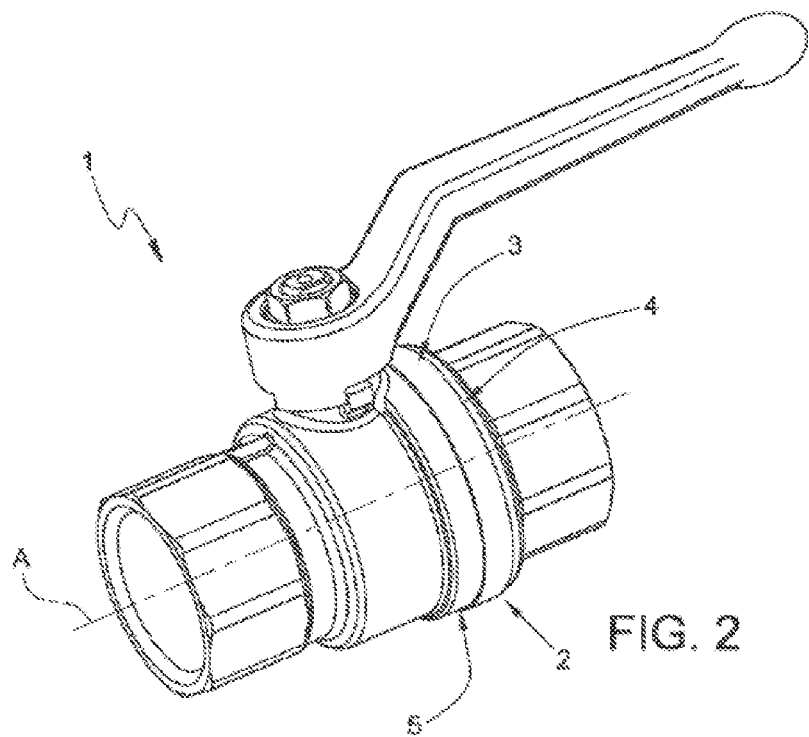
FIG. 2 is a schematic, perspective view, with parts removed for greater clarity, of the component of FIG. 1.

With reference to FIGS. 1 and 2, the component 1 comprises at least one tubular portion 2 extending around an axis A and an annular identifying band 3, which is coupled to the tubular portion 2.

Preferably, the identifying band 3 is coupled in a rotary manner around the axis A.

Annular means that the identifying band has a ring shape. The inner annular surface and/or the outer annular surface of the ring can be faceted or cylindrical or a various combination of these solutions. In the non-limiting embodiment described and shown herein, the inner annular surface and the outer annular surface are both cylindrical with a circular cross section. According to a variant which is not shown herein, the inner annular surface and/or the outer annular surface of the ring can have a first cylindrical portion and a second faceted portion, which follow one another in an axial direction.

In the non-limiting embodiment described and shown herein, the tubular portion 2 is provided with an annular seat 4, which, in use, at least partially houses the identifying band 3.

In detail, the annular seat 4 and the identifying band 3 are shaped so as to avoid axial movements of the identifying band 3 and so as to permit rotary movements of the identifying band 3 around the axis A.

In the non-limiting embodiment described and shown herein, the annular seat 4 is substantially defined by a groove obtained along the outer surface 5 of the tubular portion 2.

The annular seat 4 is axially delimited by two abutments 6. In this way, when the identifying band 3 is housed in the annular seat 4, the axial movements of the identifying band 3 are forbidden by the abutments 6.

The annular seat 4 further has an annular base 7 comprised between the abutments 6.

The identifying band 3 is housed in the annular seat 4 with a radial clearance, so as to permit a free rotation of the identifying band 3 when it is needed.

The coupling between the identifying band 3 and the tubular portion 2 can obviously be obtained also in a different manner.

The identifying band 3 is preferably defined by a ring having a constant axial width.

In other words, the identifying band 3 does not have recesses or narrow portions.

According to a variant which is not shown herein, the band is steadily fixed to the tubular portion so as to avoid the rotation thereof.

The identifying band 3 is provided with at least one graphic identification element.

The expression "graphic identification element" defines, for example, a colour and/or an identification code and/or a particular surface finishing and/or technical information and/or information concerning the installation date and/or origin information (for instance, manufacturer's trademark) and/or abbreviations referring to the compliance with reference regulations, etc.

For example, blue can be used to identify components used in cold water circuits, red can be used to identify components used in hot water circuits and yellow can be used to identify components used in gas circuits. Of course, any colour and/or combination of colours can be adopted in order to transmit a given message to consumers and/or installers.

With reference to FIG. 1, the identifying band comprises an annular support body 8 provided with an outer annular surface 9, which is visible when the identifying band 3 is housed in the annular seat 4, and with an inner annular surface 10, which is not visible when the identifying band 3 is housed in the annular seat 4 (FIG. 2).

The outer annular surface 9 can preferably be at least partly coated with a coating made of a material that is different from the material of the support body 8.

In the non-limiting embodiment described and shown herein, the inner annular surface 10 has a substantially smooth surface finishing. In other words, the inner annular surface 9 is free from roughness and ripples, which might limit the rotation of the identifying band 3 relative to the annular seat 4.

Further variants can obviously involve couplings between the identifying band 3 and the annular seat 4 that use non-smooth surface finishings and, anyway, permit a relative sliding between the parts.

Preferably, the outer annular surface 9 is coated with a material that can be written with ink by a user/installer. By so doing, wordings/warnings/notes can be written on the band upon installation, according to the use of the component.

Preferably, the identifying band 3 is removable.

In the non-limiting embodiment described and shown herein, the support body 8 of the identifying band 3 is made of a material permitting a radial deformation of the identifying band 3 so as to allow it, when subjected to stress, to come out of the annular seat 4 or of the housing in the annular seat 4.

Preferably, the support body 8 of the identifying band 3 is made of a material that is different from the (generally metal) material making up the annular seat 4 of the tubular portion 2.

Figure 3:
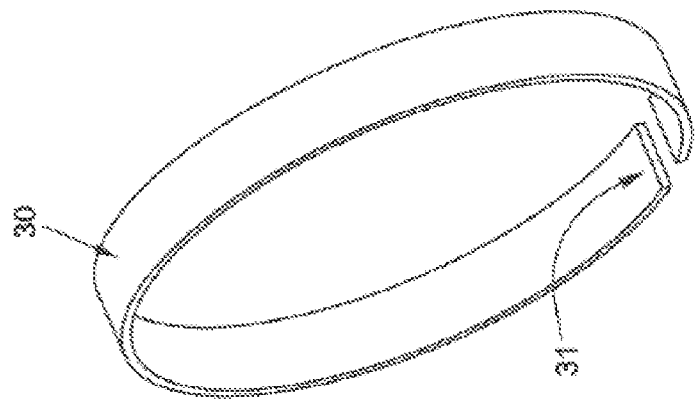
FIG. 3 is a schematic, perspective view of a detail of the component according to a first variant of the invention.

Preferably, the support body 8 of the identifying band 3 is made of a polymer material. For example, the support body 8 can be made of plastic or rubber. According to a variant shown in FIG. 3, the identifying band 30 is defined by an open ring. In other words, the identifying band 30 has an interruption 31. This interruption allows the ring to be radially deformed so as to easily permit the insertion and the removal of the identifying band 30 into/from the annular seat 4.

According to a variant which is not shown herein, the identifying band is at least partly made of a thermosensitive material capable of changing colour according to its temperature. In this way, the identifying band is capable of automatically signalling temperatures deemed to be too high or dangerous for the utility.

According to a further variant which is not shown herein, the identifying band is at least partially made of a self-shrinking, thermosensitive material capable of shrinking according to its temperature. In this way, the band can be sized so as to permit an easy insertion into the respective annular seat. Once it is placed in the seat, the coupling between the annular seat and the identifying band is simply obtained by heating the identifying band (for instance, by means of a lighter or of a device with a hot air jet, etc.).

According to a further variant which is not shown herein, the identifying band is at least partially made of a fluorescent material. In this way, users can easily identify the component even under conditions of scarce visibility. This solution is very useful when dealing with valves that must be operated in case of emergency.

Figure 4:
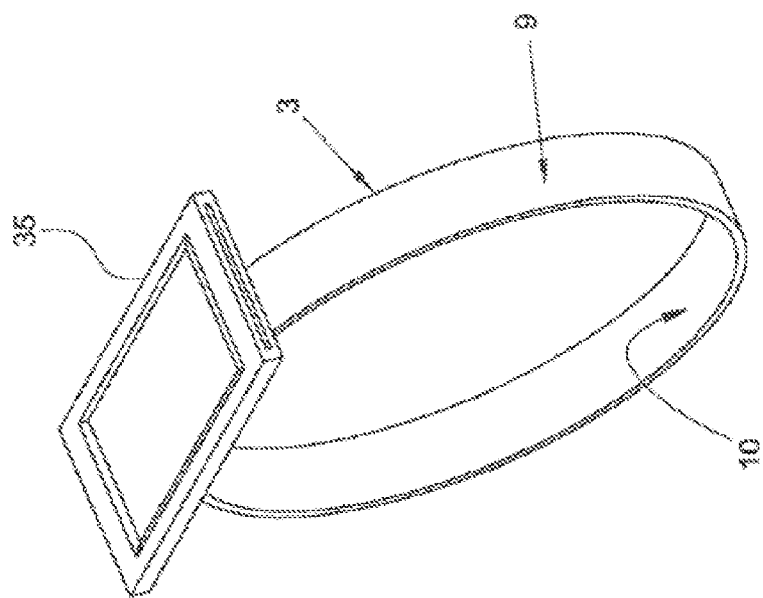
FIG. 4 is a schematic, perspective view of a detail of the component according to a second variant of the invention.

FIG. 4 shows a further variant of the invention, wherein the identifying band 3 is coupled to a flat plate 35 arranged substantially tangent to the outer annular surface 9.

The flat plate 35 is preferably provided with a seat for housing one or more labels (which is not clearly visible in FIG. 4). Preferably, the labels can be housed so as to allow them to be replaced depending on the need of the installer and of the maintenance operator. This solution is particularly useful in order to write on the label the function of the component and/or the date of overhaul/replacement.

Figure 5:
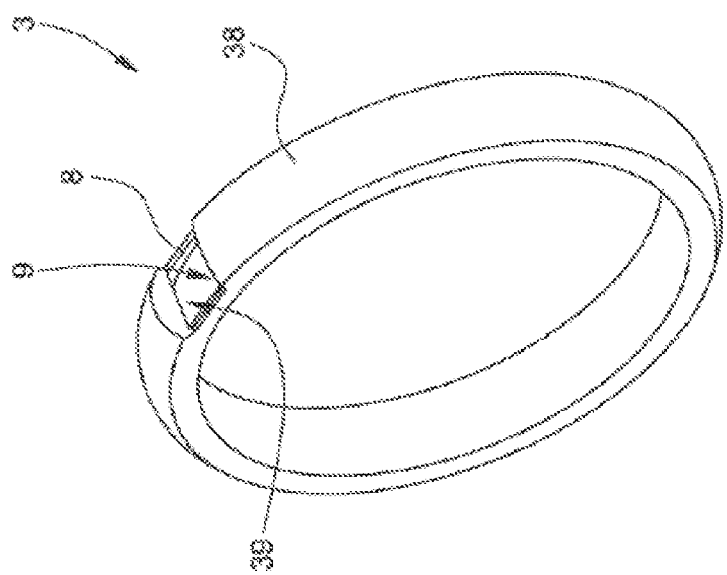
FIG. 5 is a schematic, perspective view of a detail of the component according to a third variant of the invention.

According to a variant shown in FIG. 5, the support body 8 is coupled to a magnifying glass 38, which surrounds the support body 8 substantially along a large part of the annular length of the support itself. By so doing, all the items of information written on the outer annular surface of the identifying band 3 can be more easily read.

Preferably, between the magnifying glass and the support body there is a space 39 for the possible housing of a label which can easily be inserted/removed so as to allow it to be replaced according to the needs of the installer and/or of the maintenance operator. This solution is particularly useful in order to write on the label the function of the component and/or the date of overhaul/replacement.

According to a variant which is not shown herein, the support body is manufactured as one single piece together with the magnifying glass.

The magnifying glass 38 is preferably made of a convex, flat, optical element.

Figure 6:
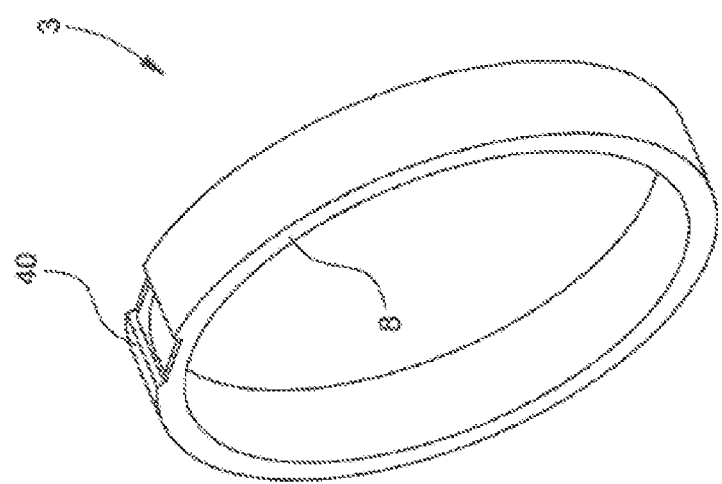
FIG. 6 is a schematic, perspective view of a detail of the component according to a fourth variant of the invention.

According to the variant shown in FIG. 6, the support body 8 is coupled to a magnifying glass 40 in the form of an optical element with a rectangular cross section.

According to a variant of the invention which is not shown herein, the support body is coupled to a magnifying glass, which is coupled to the support body in a sliding manner. According to this solution, the magnifying glass does not extend along the entire length of the support body. In order to facilitate the reading of the items of information written on the entire identifying band it is sufficient, in this case, to move the magnifying glass along the support body.

Finally, it is clear that the component and the valve described herein can be subjected to changes and variations, without for this reason going beyond the scope of protection of the appended claims.

The invention claimed is:

1. A component for a fluidic circuit, comprising:
   at least one tubular portion extending around an axis (A); and
   at least one annular identifying band coupled to the tubular portion, wherein:
   the tubular portion is provided with an annular seat;
   the identifying band is at least partially housed in said annular seat; and
   the annular seat and the identifying band being shaped, wherein axial movements of the identifying band are avoided, and rotary movements of the identifying band around the axis (A) are permitted.

2. The component according to claim 1, wherein the identifying band is coupled to the tubular portion in a rotary manner around the axis (A).

3. The component according to claim 1, wherein the identifying band is provided with at least one graphic identification element.

4. A component according to claim 3, wherein the graphic identification element comprises at least one or more items of information concerning the component or use of the component.

5. The component according to claim 1, wherein the identifying band can be removed when needed.

6. The component according to claim 1, wherein the identifying band is steadily fixed to the tubular portion.

7. The component according to claim 1, wherein the identifying band is made of a material that at least partly permits a radial deformation of the identifying band.

8. The component according to claim 1, wherein the identifying band is defined by an open ring.

9. The component according to claim 1, wherein the identifying band is at least partly made of a material that is different from a material making up the tubular portion.

10. The component according to claim 1, wherein the identifying band is at least partly made of a same material as the tubular portion.

11. The component according to claim 1, wherein the identifying band is at least partly made of a polymer material.

12. The component according to claim 1, wherein the identifying band is at least partly made of a thermosensitive material capable of changing color according to its temperature.

13. The component according to claim 1, wherein the identifying band is at least partly made of a self-shrinking, thermosensitive material capable of shrinking according to its temperature.

14. The component according to claim 1, wherein the identifying band is at least partly made of a fluorescent material.

15. The component according to claim 14, wherein:
the identifying band comprises an annular support body provided with an outer annular surface;
the identifying band is visible when the identifying band is housed in the annular seat; and
the outer annular surface is at least partly coated with a coating made of a material that is different from the material of the support body.

16. The component according to claim 15, wherein the material coating the outer annular surface can be written with ink.

17. The component according to claim 1, wherein:
the identifying band comprises an annular support body provided with an outer annular surface;
the outer annular surface is visible when the identifying band is housed in the annular seat; and
the outer annular surface is coupled to a flat plate arranged substantially tangent to the outer annular surface.

18. The component according to claim 17, wherein the flat plate is provided with a seat for housing labels.

19. The component according to claim 1, wherein:
the identifying band comprises an annular support body provided with an outer annular surface;
the outer annular surface is visible when the identifying band is housed in the annular seat; and
the identifying band is provided with a magnifying glass coupled to the support body so as to make it easier for the items of information written on the outer annular surface to be read.

20. The component according to claim 1, wherein the identifying band is defined by a ring having a constant axial width.

21. A valve for use in a fluidic circuit comprising:
at least one tubular portion extending around an axis (A); and
at least one annular identifying band coupled to the tubular portion wherein: the tubular portion is provided with an annular seat; the identifying band is at least partially housed in said annular seat; and the annular seat and the identifying band being shaped, wherein axial movements of the identifying band are avoided, and rotary movements of the identifying band around the axis (A) are permitted.

* * * * *